(12) United States Patent
Mir Ahmadi et al.

(10) Patent No.: US 10,664,552 B2
(45) Date of Patent: *May 26, 2020

(54) STREAM PROCESSING FOR LU DECOMPOSITION

(71) Applicant: International Business Machines Corporation, Armonk, NY (US)

(72) Inventors: Maysam Mir Ahmadi, London (CA); Sean Wagner, Markham (CA)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/371,531

(22) Filed: Apr. 1, 2019

(65) Prior Publication Data

US 2019/0228052 A1 Jul. 25, 2019

Related U.S. Application Data

(63) Continuation of application No. 15/834,301, filed on Dec. 7, 2017, now Pat. No. 10,331,762.

(51) Int. Cl.
*G06F 17/16* (2006.01)

(52) U.S. Cl.
CPC .................. *G06F 17/16* (2013.01)

(58) Field of Classification Search
CPC ....................................................... G06F 17/16
USPC ........................................................ 708/520
See application file for complete search history.

(56) References Cited

U.S. PATENT DOCUMENTS

| | | | |
|---|---|---|---|
| 6,636,828 B1 | 10/2003 | Hachiya | |
| 7,483,937 B2 | 1/2009 | Nakanishi | |
| 8,443,031 B1 | 5/2013 | Rao | |
| 8,775,495 B2 | 7/2014 | Lumsdaine et al. | |
| 9,001,924 B1 | 4/2015 | Wu et al. | |
| 9,047,227 B2 | 6/2015 | Chen et al. | |
| 2009/0292758 A1 | 11/2009 | Brokenshire et al. | |
| 2016/0357707 A1 | 12/2016 | Takeshige | |
| 2017/0242826 A1 | 8/2017 | Takeshige | |

OTHER PUBLICATIONS

Jaiswal et al., "FPGA-Based High-Performance and Scalable Block LU Decomposition Architecture", IEEE Transaction of Computers, vol. 61, No. 1, Jan. 2012, pp. 60-72.
(Continued)

*Primary Examiner* — Tan V Mai
(74) *Attorney, Agent, or Firm* — Scully, Scott, Murphy & Presser, P.C.; Scott Dobson, Esq.

(57) ABSTRACT

An apparatus and method for LU decomposition of an input matrix, the input matrix comprising a multitude of elements forming a plurality of rows and columns. In an embodiment, the apparatus comprises a memory including a plurality of memory caches, and a processor unit operatively connected to the memory to transmit data to and receive data from the memory caches. The processing unit comprises a hardware circuit for processing the input matrix column-by-column to decompose the input matrix into a lower triangular matrix L and an upper triangular matrix U, including performing Gaussian eliminations on the columns of the matrix, with partial pivoting of the matrix, and choosing one of the elements of each of the columns as a pivot element for said each column while said each column is being processed.

19 Claims, 7 Drawing Sheets

LU PROCESS BLOCK DIAGRAM

(56) References Cited

OTHER PUBLICATIONS

Johnson et al., "Sparse LU Decomposition using FPGA", International Workshop on State-of-the-Art in Scientific and Parallel Computing (PARA) May 13-16, 2008.
Wang et al., "Parallel LU Factorization of Sparse Matrices on FPGA-Based Configurable Computing Engines", Concurrency and Computation: Practice and Experience, 16(4), Apr. 2004, pp. 319-343.
Wu et al., "FPGA Accelerated Parallel Sparse Matrix Factorization for Circuit Simulations", International Symposium on Applied Reconfigurable Computing, ARC 2011: Reconfigurable Computing: Architectures, Tools and Applications, Belfast, UK, Mar. 23-25, 2011, pp. 302-315.
Choi et al., "Time and Energy Efficient Matrix Factorization Using FPGAs", International Conference on Field Programmable Logic and Applications, FPL 2003: Field Programmable Logic and Application, Sep. 1-3, 2004, Lisbon, Portugal, pp. 507-519.
Zhuo et al., "High-Performance and Parameterized Matrix Factorization on FPGAs", IEEE 2006, 2006 International Conference on Field-Programmable Logic and Applications, Madrid, Spain, Aug. 28-30, 2006.
Siddhartha et al., "Heterogeneous Dataflow Architectures for FPGA-based Sparse LU Factorization", 2014 24the International Conference on Field Programmable Logic and Applications (FPL), Sep. 2-4, 2014, Munich, Germany, http://ieeexplore.ieee.org/xpl/articleDetails.jsp?arnumber=6927401&newsearch=true&queryText=accelerate%20LU%20decomposition%20in%20a%20field%20programmable%20gate%20arrays.
Wang et al., "An Implementation Architecture Design of LU Decomposition in Resource-limited System", 2015 IEEE International Symposium on Systems Engineering (ISSE). Sep. 28-30, 2015; http://ieeexplore.ieee.org/xpl/articleDetails.jsp?arnumber=7302767&newsearch=true&queryText=accelerate%20LU%20decomposition%20in%20a%20field%20programmable%20gate%20arrays.
Fang et al., "Single-precision LU decomposition based on FPGA compared with CPU", 2012 International Conference on Computational Problem-Solving (ICCP), Oct. 19-21, 2012; http://ieeexplore.ieee.org/xpl/articleDetails.jsp?arnumber=6384247&newsearch=true&queryText=accelerate%20LU%20decomposition%20in%20a%20field%20programmable%20gate%20arrays.
Ren et al., "Sparse LU Factorization for Parallel Circuit Simulation on GPU", DAC 2012, Jun. 3-7, 2012, San Francisco, CA, USA.
List of IBM Patents or Patent Applications Treated as Related.

LU DECOMPOSITION ON COLUMN 1

| READ | $\begin{bmatrix} 2 \\ 3 \\ 1 \\ 2 \end{bmatrix}$ |
|---|---|
| UPDATE | NOTHING TO DO |
| PIVOT | $P=[2]$ |
| DIVIDE | $\begin{bmatrix} 2 \\ 3 \\ 1 \\ 2 \end{bmatrix} \div 3 = \begin{bmatrix} 0.66 \\ 1 \\ 0.33 \\ 0.66 \end{bmatrix}$ |
| FACTORS | $L = \begin{bmatrix} 0.66 \\ 1 \\ 0.33 \\ 0.66 \end{bmatrix}, \quad U = \begin{bmatrix} 3 \end{bmatrix}$ |

FIG. 1

LU DECOMPOSITION ON COLUMN 2

| READ | $\begin{bmatrix} 5 \\ 2 \\ 0 \\ 4 \end{bmatrix}$ |
|---|---|
| UPDATE | APPLY COLUMN 1 UPDATE: $\begin{bmatrix} 5 \\ 2 \\ 0 \\ 4 \end{bmatrix} - 2 \begin{bmatrix} 0.66 \\ 0 \\ 0.33 \\ 0.66 \end{bmatrix} = \begin{bmatrix} 3.66 \\ 2 \\ -0.66 \\ 2.66 \end{bmatrix}$ |
| PIVOT | $P = [2\ 1]$ |
| DIVIDE | $\begin{bmatrix} 3.66 \\ -0.66 \\ 2.66 \end{bmatrix} \div 3.66 = \begin{bmatrix} 1 \\ -0.18 \\ 0.72 \end{bmatrix}$ |
| FACTORS | $L = \begin{bmatrix} 0.66 & 1 \\ 1 & \\ 0.33 & -0.18 \\ 0.66 & 0.72 \end{bmatrix},\ U = \begin{bmatrix} & 3.66 \\ 3 & 2 \end{bmatrix}$ |

FIG. 2

LU DECOMPOSITION ON COLUMN 3

| READ | $\begin{bmatrix} 1 \\ 4 \\ -1 \\ 9 \end{bmatrix}$ |
|---|---|
| UPDATE | APPLY COLUMN 1 UPDATE: $\begin{bmatrix} 1 \\ 4 \\ -1 \\ 9 \end{bmatrix} - 4 \begin{bmatrix} 0.66 \\ 0 \\ 0.33 \\ 0.66 \end{bmatrix} = \begin{bmatrix} -1.66 \\ 4 \\ -2.33 \\ 6.33 \end{bmatrix}$<br><br>APPLY COLUMN 2 UPDATE: $\begin{bmatrix} -1.66 \\ 4 \\ -2.33 \\ 6.33 \end{bmatrix} - (-1.66) \begin{bmatrix} 0 \\ 0 \\ -0.18 \\ 0.72 \end{bmatrix} = \begin{bmatrix} -1.66 \\ 4 \\ -2.66 \\ 7.54 \end{bmatrix}$ |
| PIVOT | $P = [2\ 1\ 4]$ |
| DIVIDE | $\begin{bmatrix} -2.63 \\ 7.54 \end{bmatrix} \div 7.54 = \begin{bmatrix} -0.35 \\ 1 \end{bmatrix}$ |
| FACTORS | $L = \begin{bmatrix} 0.66 & 1 & & \\ 1 & & & \\ 0.33 & -0.18 & -0.35 & \\ 0.66 & 0.72 & 1 & \end{bmatrix}$, $U = \begin{bmatrix} 3.66 & -1.66 \\ 3 & 2 & 4 \\ & & 7.54 \end{bmatrix}$ |

FIG. 3

LU DECOMPOSITION ON COLUMN 4

| READ | $\begin{bmatrix} -1 \\ 5 \\ 3 \\ 2 \end{bmatrix}$ |
|---|---|
| UPDATE | APPLY COLUMN 1 UPDATE: $\begin{bmatrix} -1 \\ 5 \\ 3 \\ 2 \end{bmatrix} - 5 \begin{bmatrix} 0.66 \\ 0 \\ 0.33 \\ 0.66 \end{bmatrix} = \begin{bmatrix} -4.33 \\ 5 \\ 1.33 \\ -1.33 \end{bmatrix}$ <br><br> APPLY COLUMN 2 UPDATE: $\begin{bmatrix} -4.33 \\ 5 \\ 1.33 \\ -1.33 \end{bmatrix} - (-4.33) \begin{bmatrix} 0 \\ 0 \\ -0.18 \\ 0.72 \end{bmatrix} = \begin{bmatrix} -4.33 \\ 5 \\ 0.55 \\ 1.82 \end{bmatrix}$ <br><br> APPLY COLUMN 3 UPDATE: $\begin{bmatrix} -4.33 \\ 5 \\ 0.55 \\ 1.82 \end{bmatrix} - 1.82 \begin{bmatrix} 0 \\ 0 \\ -0.35 \\ 0 \end{bmatrix} = \begin{bmatrix} -4.33 \\ 5 \\ 1.18 \\ 1.82 \end{bmatrix}$ |
| PIVOT | $P = [2\ 1\ 4\ 3]$ |
| DIVIDE | $\begin{bmatrix} 1.18 \end{bmatrix} \div 0.18 = \begin{bmatrix} 1 \end{bmatrix}$ |
| FACTORS | $L = \begin{bmatrix} 0.66 & 1 & & \\ 1 & & & \\ 0.33 & -0.18 & -0.35 & 1 \\ 0.66 & 0.72 & 1 & \end{bmatrix}, U = \begin{bmatrix} 3.66 & -1.66 & & -4.33 \\ 3 & 2 & 4 & 5 \\ & & & 1.18 \\ & & 7.54 & 1.82 \end{bmatrix}$ |

FIG. 4

CALCULATION ENGINE BLOCK DIAGRAM

STREAM PROCESSING FOR LU DECOMPOSITION

CROSS REFERENCE TO RELATED APPLICATION

This application is a continuation of copending U.S. patent application Ser. No. 15/834,301, filed Dec. 7, 2017, the entire contents and disclosure of which are hereby incorporated herein by reference.

BACKGROUND

This invention generally relates to stream processing for LU decomposition. More specifically, embodiments of the invention relate to stream processing for LU decomposition in a hardware circuit.

Decomposing a matrix to several components appears in many calculations, from highly scientific applications to everyday financial transactions to a simple search. For instance, it has been estimated that 70% of the processing in server farms involves solving a linear system, which one of its common solutions is to decompose a matrix into lower and upper triangular parts, namely LU decomposition. Investigations show that in this example, more than 95% of the processing time is the LU decomposition. Therefore, accelerating LU decomposition will decrease the processing time and increase performance.

SUMMARY

Embodiments of the invention provide an apparatus and method for LU decomposition of an input matrix, the input matrix comprising a multitude of elements forming a plurality of rows and columns. In an embodiment, the apparatus comprises a memory including a plurality of memory caches, and a processor unit operatively connected to the memory to transmit data to and receive data from the memory caches. The processing unit comprises a hardware circuit for processing the input matrix column-by-column to decompose the input matrix into a lower triangular matrix L and an upper triangular matrix U, including performing Gaussian eliminations on the columns of the matrix, with partial pivoting of the matrix, and choosing one of the elements of each of the columns as a pivot element for said each column while said each column is being processed.

Embodiments of the invention allow stream processing of the input matrix to the processor. With conventional LU decomposition, to choose the pivot row in partial pivoting, the algorithm has to traverse the column for which pivoting happens and then traverse the matrix row-by-row to perform Gaussian elimination. This means that column access and row access are required, which creates random access to the matrix, causes cache misses and breaks bursty reads. Embodiments of the invention read the columns and then process the matrix column-by-column. This allows streaming the matrix to the processor, which accelerates the read process significantly.

Embodiments of the invention provide unified processing of dense/sparse matrices. Unlike many of the efforts to implement LU decomposition on FPGA, the architecture of embodiments of the invention targets sparse matrices. In practice almost all systems are represented by sparse matrices, however, the very difficult challenges in processing sparse matrices discourage developments for them. The architecture, in embodiments of the invention, is unique in that first, the architecture processes sparse matrices in hardware and second, the same hardware is capable of processing dense matrices with little overhead.

Embodiments of the invention provide fast internal on-chip cache for fast access to matrix elements where random accesses are necessary. One of the main drawbacks of the typical partial pivoting LU decomposition algorithm is that the decomposition requires to access the matrix by row index and by column index, which causes random access to the memory. While this random access is necessary to perform the decomposition, it is possible to limit the degradation caused by the random access. Specifically, embodiments of the invention incorporate special caches in the design to store the parts of the matrix and intermediate results that require to be accessed in random fashion. These caches are implemented on-chip with fast memories. This limits the scope of random access to on-chip caches and significantly improves the performance. The rest of the matrix can be streamed without the need for going through a cache.

Embodiments of the invention hide the long latency of the floating-point calculations which causes stalls between processing consecutive row elements. The Gaussian elimination process is basically an accumulation of elements multiplied by the pivot row. Since the floating point addition has high latency, the naïve approach which waits for the result of one calculation to do the next calculation, causes large stalls in processing. Thus, different approaches have been proposed to interleave the calculations or create addition trees. Such systems would create extra complexity which is very expensive for FPGA implementations. Instead, in embodiments of the invention, the accumulations are performed column-by-column, which creates a basic interleaving between the subsequent elements of rows. This technique leaves enough space for hiding the calculations' latency and prohibits stalls in most cases. In an embodiment, if the space is not enough and the results are not ready in time to sustain continuous processing, the situation can be ratified by sending next column calculations. The system keeps the processor practically active all the time.

Embodiments of the invention ma be used with any suitable interface to source input data and write output data. For instance, embodiments of the invention deploy the engine with Coherent Accelerator Processor Interface (CAPI) for POWER8 machines. Embodiments of the invention have been implemented with CAPI interface which allows direct access to memory and removes the need for the processor or a DMA controller to manage the memory interactions. This accelerates the process and enables streaming. Other suitable interfaces may be used with embodiments of the invention.

In embodiments of the invention, different pivoting is possible. There are many different metrics for choosing the pivot row. One suitable metric is to use the element with the largest magnitude to improve numerical properties. Another metric is to use the number of nonzeros in rows and columns as well the magnitude of the element to strike a balance between the number of fill-ins and numerical stability. Both techniques are supported in the architecture of embodiments of the invention.

In embodiments of the invention, the architecture is designed in a way that it can generate LDU decomposition instead of LU decomposition without extra processing time. Although the description herein refers to column processing of column-major matrices, the matrices can be rearranged to process the matrices row-wise.

In addition, taking advantage of heterogeneous computing, embodiments of the invention use specific circuits to perform the calculations efficiently, consuming only a fraction of what a CPU would consume for the same operation. This means that the challenging cooling problem in server farms can be ameliorated.

BRIEF DESCRIPTION OF THE SEVERAL VIEWS OF THE DRAWINGS

FIG. 1 shows a procedure for processing a column of a matrix to start an LU decomposition of the matrix in an embodiment of the invention.

FIG. 2 shows a procedure for processing a second column of the matrix in an embodiment of the invention.

FIG. 3 illustrates a procedure for processing a third column of the matrix in an embodiment of the invention.

FIG. 4 illustrates a procedure for processing a fourth column of the matrix in the LU decomposition in an embodiment of the invention.

DETAILED DESCRIPTION

Figure 5:
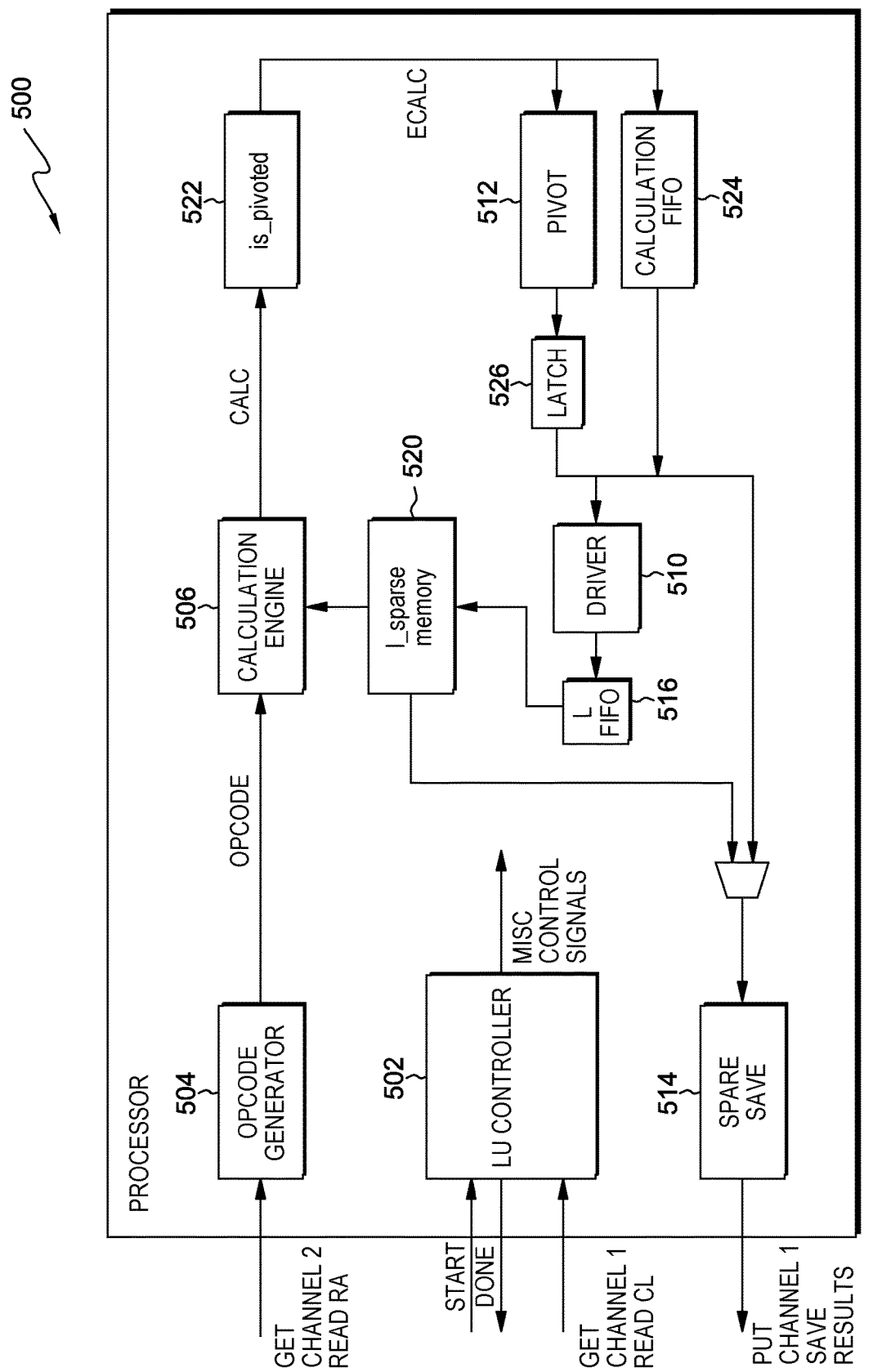
FIG. 5 is a block diagram of an LU processor in accordance with an embodiment of the invention.

Embodiments of the invention provide an apparatus and method for LU decomposition of an input matrix, the input matrix comprising a multitude of elements forming a plurality of rows and columns. In an embodiment, the apparatus comprises a memory including a plurality of memory caches, and a processor unit operatively connected to the memory to transmit data to and receive data from the memory caches. The processing unit comprises a hardware circuit for processing the input matrix column-by-column to decompose the input matrix into a lower triangular matrix L and an upper triangular matrix U, including performing Gaussian eliminations on the columns of the matrix, with partial pivoting of the matrix, and choosing one of the elements of each of the columns as a pivot element for said each column while said each column is being processed.

In embodiments of the invention, the apparatus reads two arrays RA and CL that represent the input matrix A in the sparse format and decomposes the matrix to the triangular matrices L and U. Then the system stores L and U in the sparse format as well and reports the addresses of the arrays.

In order to use the algorithm for a broad range of matrices and to ensure that the algorithm works for a general matrix, partial pivoting LU decomposition is implemented. i.e.,

PA=LU, where P is a permutation matrix that changes the order of the rows in order to get a more stable decomposition with fewer nonzeros. In hardware implementation, the largest element is chosen to use for achieving numerical accuracy and simplicity in the design. However, the hardware can be changed to consider the number of fill-ins as well.

Moreover, although disclosed implementations perform LU decomposition, these implementations can record diagonal elements as well, and use the idle cycles in the divider to perform LDU decomposition, which may outperform the LU decomposition for solving linear systems on FPGA.

LU Decomposition Algorithm

In order to decompose a matrix, a pivot element needs to be chosen. This requires to read a single column to find the best candidates and then performing Gaussian elimination on the pivot row. This means that a naive implementation requires to have access to A in row-major and column-major format. In addition to added memory requirement, this means that A has to be maintained in both formats. The overhead of such operation is very high, and in many situations, not acceptable.

Instead of requiring access to A in row-major and column-major format, embodiments of the invention perform the Gaussian eliminations per column.

The Gaussian elimination per column algorithm generally follows the common Gaussian elimination per row algorithm. Elements in each column are eliminated at each iteration in the corresponding rows. The algorithm is structured such that each column from the original matrix A is only read once. This scheme requires that when processing each column, all of the operations performed on the rows of previous columns must be applied for consistency. In the final output, the L matrix contains the divisors used in the Gaussian elimination process, and the U matrix will contain the updated columns.

For every column, the following steps happen:
1. Read the column;
2. Update the column to reflect the prior eliminations;
3. Chose the pivot element;
4. Divide non-pivoted elements; and
5. Update factors in L and U.

Each of these steps is described in more detail below.
1. Read the column: read the current column from memory.
2. Update the column: the operations performed on the previous columns are applied to the current column. This makes the current column consistent with what would have happened under the usual row-based Gaussian elimination algorithm. The column is updated in a series of sub-steps in which each of the elimination steps on the previous columns is applied to the current column using the previously computed multipliers stored in the L matrix. Correct values for the elements of the pivoted rows in the current column are computed on-the-fly at each sub-step and forwarded to the next sub-step. Given the pivot array PH which stores the indicies of the previous pivot rows, the update process for the i-th column is illustrated as follows:

Apply column 1 update:

$$\begin{bmatrix} a_1 \\ a_2 \\ a_3 \\ \vdots \\ a_n \end{bmatrix}^{(1)} - p_1 \begin{bmatrix} m_{1,1} \\ m_{2,1} \\ m_{3,1} \\ \vdots \\ m_{n,1} \end{bmatrix} = \begin{bmatrix} a_1 \\ a_2 \\ a_3 \\ \vdots \\ a_n \end{bmatrix}^{(2)}$$

where $p_1 = a_{p(1)}^{(1)}$
Apply column 2 update:

$$\begin{bmatrix} a_1 \\ a_2 \\ a_3 \\ \vdots \\ a_n \end{bmatrix}^{(2)} - p_1 \begin{bmatrix} m_{1,2} \\ m_{2,2} \\ m_{3,2} \\ \vdots \\ m_{n,2} \end{bmatrix} = \begin{bmatrix} a_1 \\ a_2 \\ a_3 \\ \vdots \\ a_n \end{bmatrix}^{(3)}$$

where $p_2 = a_{p(2)}^{(2)}$
Apply column i−1 update:

$$\begin{bmatrix} a_1 \\ a_2 \\ a_3 \\ \vdots \\ a_n \end{bmatrix}^{(i-1)} - p_{i-1} \begin{bmatrix} m_{1,i-1} \\ m_{2,i-1} \\ m_{3,i-1} \\ \vdots \\ m_{n,i-1} \end{bmatrix} = \begin{bmatrix} a_1 \\ a_2 \\ a_3 \\ \vdots \\ a_n \end{bmatrix}^{(i)}$$

where $p_{i-1} = a_{p(i-1)}^{(i-1)}$
where $m_{j,k}$ are the multipliers stored in the partially completed L matrix. Note that for the first column, this operation is skipped entirely since there are no prior updates to apply.
3. Choose pivot: among the rows that were not selected as the pivot row in previous iterations, select the row in the updated current column with the largest element by absolute value to be the pivot row. Record the pivot row number in the P array.
4. Divide non-pivoted elements: Compute the multipliers for those rows in the current column that are not pivoted by dividing the non-pivoted elements by the pivot element's value.
5. Update factors: write the multipliers for the non-pivoted rows of the current column to the corresponding column of the L matrix. Pivoted elements of the updated column are written to the corresponding column of the U matrix.
Below is an example using the following matrix:

$$A = \begin{bmatrix} 2 & 5 & 1 & -1 \\ 3 & 2 & 4 & 5 \\ 1 & 0 & -1 & 3 \\ 2 & 4 & 9 & 2 \end{bmatrix}$$

The process is shown in FIG. 1-FIG. 4.

The first step in FIG. 1 is to read the first column of A. The next step of the algorithm—update the column—is not performed in the decomposition on column 1 since there are no prior updates to apply.

The pivot element is chosen. The pivot element is the largest element in the column, which is 3, and this element is in row 2. 2 is thus added to the pivot array P. In the next step, the non-pivoted elements of the column are divided by the pivot element 3, and the pivot element itself is replaced with 1.

The L and U matrices are updated. L is updated by writing the multipliers for the non-pivoted rows—that is, the results obtained by the division in the divide step—to the corresponding column of the L matrix, and a 1 is written in the row of the column of L that corresponds to the pivot row of the first column of A. U is updated by writing the element in the pivot row of the first column of A to the corresponding row in the first column of U. The other rows in this column of U are left blank.

FIG. 2 shows the LU decomposition on column 2. The first step is to read the second column of A. Column 2 is then updated based on the operations performed on column 1. In this update, an update factor is multiplied by an update matrix, and the product is then subtracted from column 2 of A. The update factor is the element in the row of column 2 that corresponds to the pivot row of column 1, and thus in this example, the update factor is 2. The update matrix comprises the elements of column 1 at the end of the divide step, with the element in the pivot row of that column replaced with a zero.

As mentioned above, this update matrix is multiplied by the update factor, and the product is subtracted from column 2 of A, resulting in the column at the end of the update step.

After the update, the pivot element of this column is chosen. The pivot element is the largest element, by absolute magnitude, in the updated column that is not in a row corresponding to the pivot row of any previously processed column. In this example, the pivot element is 3.66. This element is in the first row of the updated column and thus, 1 is added to the pivot array P.

In the divide step of FIG. 2, the element in the pivot row is replaced with 1, and the row corresponding to the pivot row of column 1 is left blank. The other elements in the column are divided by the pivot element of column 2. This produces the column at the end of the divide step.

L and U are then updated. L is updated by writing the multipliers for the non-pivoted rows of this column to the corresponding column of the L matrix. Both rows 1 and 2 are considered pivoted rows because row 2 was the pivot row of column 1, and row 1 is the pivot row of column 2. In L, a 1 is placed in the row of the second column corresponding to the pivot row of the second column of A, and the row of the second column of L that corresponds to the pivot row of the first column of A, is left blank.

U is updated by writing the elements in the rows of the updated column 2 of A that have been pivoted—that is, rows one and two—in the corresponding rows in the second column of U. The other rows in this column of U are left blank.

FIG. 3 shows the LU decomposition on column 3 of A. The first step is to read the third column of A. Column 3 is then updated based on the operations performed on columns 1 and 2 of A. A first sub-step is to update column 3 based on the operation performed on column 1 of A, and a second sub-step is to update further column 3 based on the operation performed on column 2 of A.

In the first of these updates, an update factor is multiplied by an update matrix, and the product is then subtracted from column 3 of A. The update factor is the element in the row of column 3 that corresponds to the pivot row of column 1, and thus in this example, the update factor is 4. The update matrix comprises the elements of column 1 at the end of the divide step, with the element in the pivot row of that column replaced with a zero.

As mentioned above, this update matrix is multiplied by the update factor, and the product is subtracted from column 3 of A, resulting in the first updated column 3 of A, at the upper right end of the update step of FIG. 3.

This column is then further updated to reflect the operations performed on the second column of A. A second update factor is multiplied by a second update matrix, and the product is then subtracted from first updated column 3 of A. The update factor is the element in the row of the first updated column 3 that corresponds to the pivot row of column 2, and thus in this example, the update factor is −1.66. The update matrix comprises the elements of column 2 at the end of the divide step, with the elements in the pivot rows (rows 2 and) of that column replaced with zeros.

This second update matrix is multiplied by the second update factor, and the product is subtracted from the first updated column 3 of A, resulting in the second, or final updated column at the lower right end of the update step of FIG. 3.

After the update, the pivot element of this column 3 is chosen. The pivot element is the largest element, by absolute magnitude, in the final updated column 3 that is not in a row corresponding to the pivot row of any previously processed column. In this example, the pivot element is 7.54. This element is in the fourth row of the final updated column 3 and thus, 4 is added to the pivot array P.

In the divide step of FIG. 3, the element in the pivot row of column 3 is replaced with 1, and the rows corresponding to the pivot rows of columns 1 and 2 are left blank. The remaining element in the final updated column 3 is divided by the pivot element of column 2. This produces the column at the end of the divide step.

L and U are then updated. L is updated by writing the multipliers for the non-pivoted row of this column to the corresponding column of the L matrix. Rows 1, 2 and 4 are considered pivoted rows because row 2 was the pivot row of column 1, row 1 was the pivot row of column 2, and row 4 is the pivot row of column 3. In L, a 1 is placed in the row of the third column corresponding to the pivot row of the third column of A, and the rows of the third column of L that corresponds to the pivots row of the first and second columns of A, are left blank.

U is updated by writing the elements in the rows of the final updated column 3 of A that have been pivoted—that is, rows one two and four—in the corresponding rows in the third column of U. The other row in this column of U is left blank.

FIG. 4 shows the LU decomposition on column 4 of A. The first step is to read the fourth column of A. Column 4 is then updated based on the operations performed on columns 1, 2 and 3 of A. A first sub-step is to update column 4 based on the operation performed on column 1 of A, a second sub-step is to update further column 4 based on the operation performed on column 2 of A, and a third sub-step is to update further column 4 based on the operation performed on column 3 of A.

In the first of these updates, an update factor is multiplied by an update matrix, and the product is then subtracted from column 4 of A. The update factor is the element in the row of column 4 that corresponds to the pivot row of column 1, and thus in this example, the update factor is 5. The update matrix comprises the elements of column 1 at the end of the divide step, with the element in the pivot row of that column replaced with a zero.

As mentioned above, this update matrix is multiplied by the update factor, and the product is subtracted from column 4 of A, resulting in the first updated column 4 of A, at the upper right end of the update step of FIG. 4.

This column is then further updated to reflect the operations performed on the second column of A. A second update factor is multiplied by a second update matrix, and the product is then subtracted from first updated column 4 of A. The update factor is the element in the row of the first updated column 4 that corresponds to the pivot row of column 2, and thus in this example, the update factor is −4.33. The update matrix comprises the elements of column 2 at the end of the divide step, with the elements in the pivot rows (rows 2 and 1) of that column replaced with zeros.

This second update matrix is multiplied by the second update factor, and the product is subtracted from the first updated column 4 of A, resulting in the second updated column 4 at the middle right end of the update step of FIG. 4.

After this update, column 4 is further updated to reflect the operations performed on the third column of A. A third update factor is multiplied by a third update matrix, and the product is then subtracted from second updated column 4 of A. The update factor is the element in the row of the second updated column 4 that corresponds to the pivot row of column 3, and thus in this example, the update factor is 1.82. The update matrix comprises the elements of column 3 at the end of the divide step, with the elements in the pivot rows (rows 2, 1 and 4) of that column replaced with zeros.

This third update matrix is multiplied by the third update factor, and the product is subtracted from the second updated column 4 of A, resulting in the third, or final updated column 4 at the lower right end of the update step of FIG. 4.

After the update, the pivot element of this column 4 is chosen. The pivot element is the largest element, by absolute magnitude, in the final updated column 4 that is not in a row corresponding to the pivot row of any previously processed column. In this example, only one row—row 3—has not been pivoted, and thus the pivot element is 1.18. This element is in the third row of the final updated column 4 and thus, 3 is added to the pivot array P.

In the divide step of FIG. 4, the element in the pivot row of column 4 is replaced with 1, and the rows corresponding to the pivot rows of columns 1, 2 and 3 are left blank. This produces the column at the end of the divide step.

L and U are then updated. By this point, all the rows in A have been pivoted and no not-pivoted rows remain. In L, a 1 is placed in the row of the fourth column corresponding to the pivot row of the fourth column of A, and the other rows of the fourth column of L that corresponds to the pivots row of the first, second and third columns of A, are left blank.

U is updated by writing the elements in the rows of the final updated column 4 of A that have been pivoted—which is now all the rows—in the corresponding rows in the fourth column of U.

Sparse Matrix Data Structure and Format

Data for a sparse matrix is usually stored using formats such as Compressed Sparse Row (CSR) in which the matrix is described using a series of arrays with information about only the non-zero elements of the matrix. However, formats such as CSR generally require three arrays that, while simple, are not amenable to efficient stream processing. Embodiments of the invention use a compressed format which only requires two arrays: RA and CL. The RA array contains the value and position information of the non-zero elements in each column. The CL array contains the starting index in RA of each column and length of each column.

The arrays are depicted as follows:
RA→[($a_1$, $r_1$), ($a_2$, $r_2$), ($a_3$, $r_3$) . . . ]
CL→[($i_1$,$l_1$), ($i_2$,$l_2$), ($i_3$,$l_3$) . . . ]
where $a_x$ denotes value of non-zero element x, $r_x$ is the row position of element x, $i_j$ is the index in RA where column j starts, and $l_j$ is the number of non-zero elements in column j. In memory, the ($a_x$, $r_x$) pairs and ($i_j$, $l_j$) pairs are stored together. Hence, this format coalesces memory reads of element value and position information, which is more efficient for streaming the matrix information to a custom hardware processor.

FIG. 5 is a block diagram of a processor 500 that may be used for LU decomposition in an embodiment of the invention. Generally, processor 500 comprises LU controller 502, opcode generator 504, calculation engine 506, divider 510, pivot module 512, sparse saving module 514, FIFO 516, and a group of on-chip memories and caches including L memory 520.

In embodiments of the invention, processor 500 may comprise field programmable gate arrays (FPGA). The invention can also be implemented in other circuit device types, including reprogrammable circuit device types such as Complex Programmable Logic Devices (CPLD) and Coarse-grained Reconfigurable Architectures (CGRA) and in fixed circuit devices such as Application Specific Integrated Circuits (ASIC).

Figure 6:
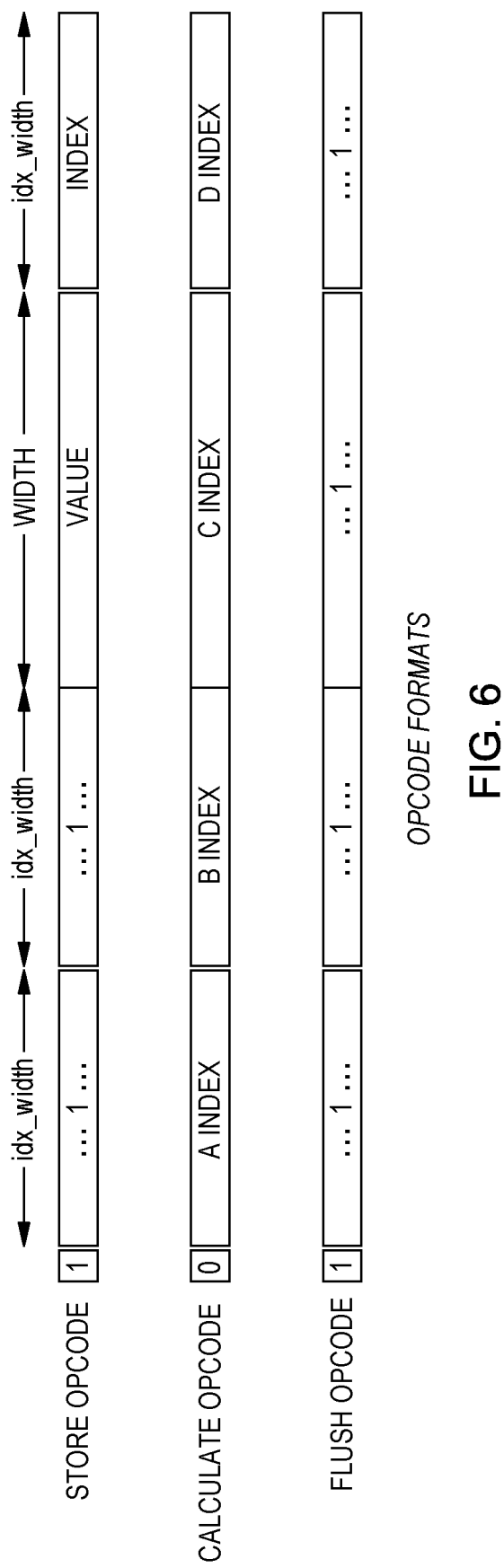
FIG. 6 shows opcode formats that may be used in embodiments of the invention.

FIG. 6 shows the formats of a group of opcodes that may be used in embodiments of the invention. In particular, FIG. 6 shows the formats for a store opcode, a calculate opcode, and a flush opcode.

With reference to FIG. 5, the process starts by asserting the start signal to controller 502. The controller then sets up the get channel 1 to itself for reading the CL array and channel 2 for reading the RA array. Then the controller 502 reads the first element on the CL channel which represents the start and length of the first column of the matrix and asserts the start signal. The controller then monitors the progress of the column processing until processing of the column ends. After that, the process is repeated for the next column of the matrix.

Opcode Generator

The Opcode generator 504 translates the processing that needs to be done on each column to a series of basic opcodes that later will be run by the calculation engine 506. Generally, the calculations are in the form of d=a+bxc, where a and b are read from an internal cache at the calculation engine, c is coming from the input to the module on the RA channel, and d is stored back in the internal cache as well. The Store opcode stores a value in the internal cache at the calculation engine. There is also another opcode, namely flush, which streams the cached data out of the internal cache.

The opcode generator 504 starts by reading the data from the RA channel and creates store opcodes to fill the internal cache at the calculation engine. Then the opcode generator reads all the L values previously calculated from the memory 520 and creates the appropriate opcodes for the calculations. Note that the pivot chosen for processing of each row is already stored along with L values in the L memory 520. The first data for each column is the index of the pivot used to process that column. The Opcode generator 504 used that pivot to form the opcodes.

For example, the following opcodes are for processing the second column of the example in FIG. 2. In these opcodes, @ represents the index of the values.

(a) 5→@0
(b) 2→@1
(c) 4→@3
(d) @0+(−0.66)*@1→@0
(e) @2+(−0.33)*@1→@2
(f) @3+(−0.66)*@1→@3
(g) Flush The first three opcodes store data in some indices in the internal cache at the calculation engine, the next three opcodes process those data, and finally the last opcode, instructs the engine to stream the results out.

Calculation Engine

Figure 7:
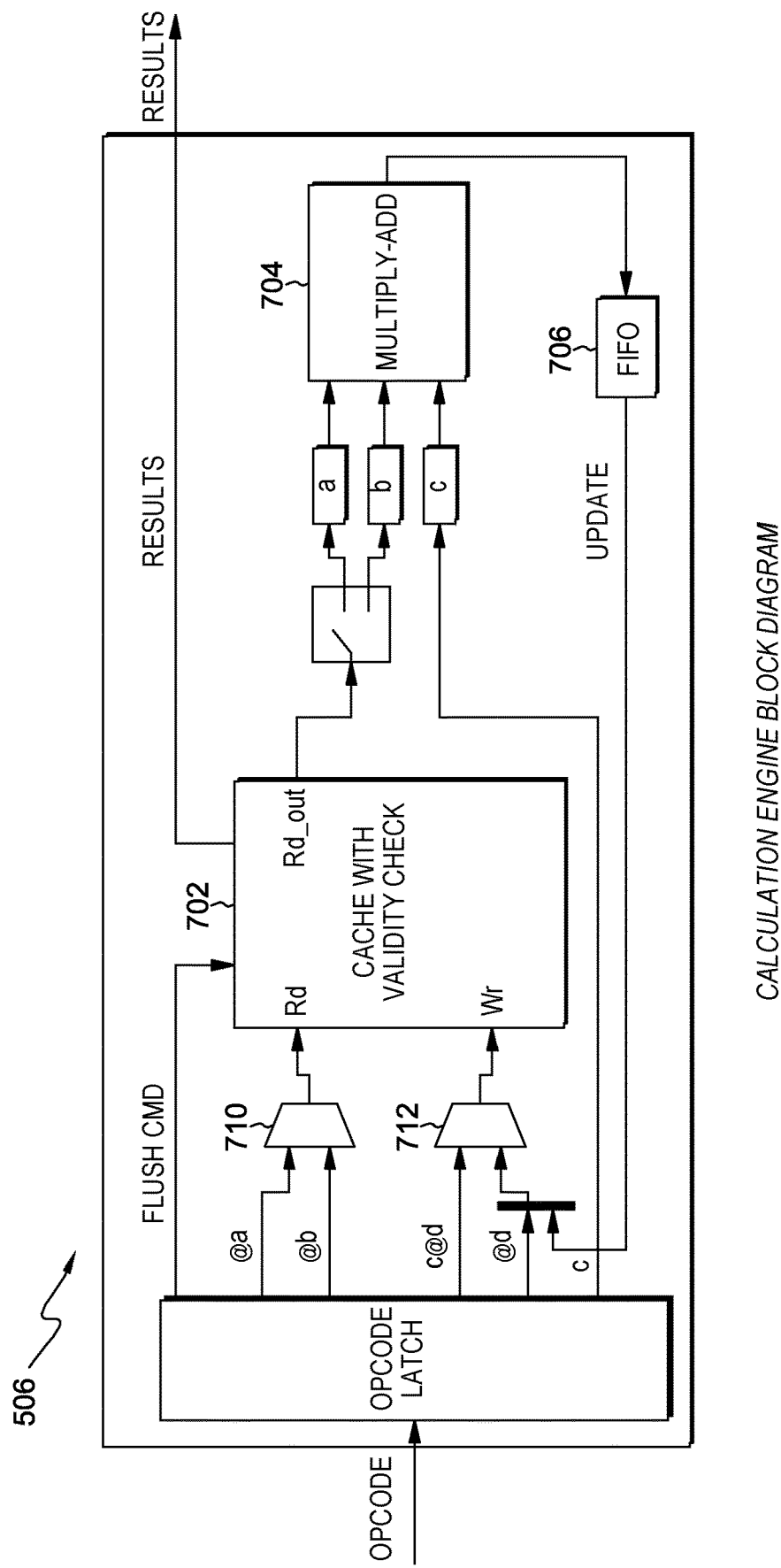
FIG. 7 is a block diagram of a calculation engine of the LU processor shown in FIG. 5.

The calculation engine 506 is shown in more detail in FIG. 7. Generally, the calculation engine includes cache 702, multiply/add unit 704, FIFO register 706, and multiplexers 710 and 712. The calculation engine executes the opcodes generated by the opcode generator 504. At the beginning of the processing of an opcode, the received opcode is latched. Then, if the received opcode is a store opcode, the value and index are extracted from the opcode and sent to the cache 702. The execution of the calculation opcode starts by reading a and b from the cache 702, which has to be done one after the other. The results are saved in corresponding registers. When all the values of a, b and c become ready, they are sent to multiply-adder 704. The results of the multiply/adder are saved to a FIFO 706 and then the cache 702 is updated. Finally, the processing of the column is finished by flushing out the data from the cache 702 which also clears the cache and makes the cache ready for the next column.

The cache 702 also synchronizes the processing of the opcodes. During the calculations, it is possible that one opcode updates an index and the next opcode reads the index. Since, the calculation engine is running asynchronously, the reading of the index might happen before writing that index, especially since the latency of the data path is relatively large. The cache 702 first, detects such dependencies and then waits for the first opcode to finish processing. The required logic for detecting such dependencies is implemented. If detected, the corresponding index in the cache 702 is invalidated. In case of reading from an invalidated index, the request is repeated internally till the data is written to that index in the cache which validates the index. This ensures the integrity of the data.

Pivoting Structures

After the calculations by the calculation engine 506, the column is updated to reflect the previous pivoting operations. In embodiments of the invention, this is the time to select the next pivot element. To do so, first, for each index value output from the calculation engine, a memory 522 is referred to identify if that index value has been used as a pivot before or not. This new information, along with the calculation results of the calculation engine, are referred to as extended calculation results, which is sent simultaneously to the pivot module 512 and to a FIFO 524. After reading the whole column, the pivot module reports the element chosen to be the pivot, and this chosen element is latched at 526 in the processor. This starts the reading of the calculation results in the FIFO 524 and feeding those results from the FIFO to the divider 510, if the element is part of the L matrix, or sending the results from the FIFO to the sparse saving module 514 to be stored in memory if the element is part of the U matrix.

If LDU decomposition is required, all elements are sent to the divider 510 and the results are stored to the U matrix afterwards.

Saving the Results

The division is the last mathematical operation on the elements of a column. Thus, the results of the division at 510 are saved in a FIFO 516 and then stored in the L memory 520. When all elements are stored in either L memory or in system RAM via the sparse save module 514, the processing of the column is finished.

The LU controller 502 monitors this processing of the column and starts the processing of a new column, or if all columns have been processed, flushes the L memory 520 and routes the content of the L memory to sparse save module 514 to store those contents in the system RAM. The sparse save module gets the data, values and indices from the L memory 520, and passes these items to the channel 2 to be stored in RA array. At the same time, the sparse save module keeps track of column processing, beginning and end, to form the CL array. After all data elements are sent to the channel, the channel requests a new address and stores the CL array.

In embodiments of the invention, a host provides the starting address. The calculation engine 506 reports the address of the CL array for the U matrix and also reports the RA and CL arrays for the L matrix at the end of the operation.

In embodiments of the invention, the results are stored in permuted row fashion. Another level of processing can be added to get the results in the typical triangular format, however, since the primary user of the results is the substitution module, this additional level of processing is not necessary and can be avoided to save on resources.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. Apparatus for LU decomposition of an input matrix, the input matrix comprising a multitude of elements forming a plurality of rows and columns, the apparatus comprising:
   a memory including a plurality of memory caches; and
   a processor unit operatively connected to the memory to transmit data to and receive data from the memory caches, the processing unit comprising a hardware circuit for:
      processing the input matrix column-by-column to decompose the input matrix into a lower triangular matrix L and an upper triangular matrix U, including performing Gaussian eliminations on the columns of the matrix, with partial pivoting of the matrix, and choosing one of the elements of each of the columns as a pivot element for said each column based on absolute magnitudes of the elements of said each column.

2. The apparatus according to claim 1, wherein the choosing one of the elements of each of the columns as a pivot element for said each column further includes identifying the elements of one or more of the rows of said each column as possible pivot elements based on the processing of one or more columns prior to the processing of said each column, and selecting one of the possible pivot elements of said each column as the pivot element of said each column.

3. The apparatus according to claim 1, wherein:
   the processing the input matrix column-by-column further includes, for each of the columns of the input matrix, reading the each column;
   when one or more of the columns of the input matrix has been processed prior to the processing of the each column, the choosing one of the elements of each of the columns as a pivot element for said each column includes choosing one of the elements of each of the columns as the pivot element for said each column based on the one or more previously processed column of the input matrix.

4. The apparatus according to claim 3, wherein the choosing one of the elements of each of the columns as the pivot element for said each column includes selecting one of the rows of said each column as a pivot row, and choosing the element of the column in the pivot row of the column as the pivot element.

5. The apparatus according to claim 4, wherein the choosing one of the elements of each of the columns as a pivot element for said each column further includes, among the rows of the matrix that were not selected as the pivot rows in the one or more previously processed columns, selecting the row of said each column with the largest element by absolute value in said each column to be the pivot row of said each column.

6. The apparatus according to claim 1, wherein the processor unit includes an opcode generator for reading data from an RA channel, and to generate a series of opcodes having instructions to process the columns of the input matrix.

7. The apparatus according to claim 6, wherein the series of opcodes includes:
   a store opcode having instructions to store specified data; and
   a calculate opcode having instructions to perform a specified calculation.

8. The apparatus according to claim 7, wherein the series of opcodes further includes a flush opcode having instructions to output specified data from one of the memory caches.

9. The apparatus according to claim 6, wherein the processor unit further includes a calculation engine to execute the opcodes generated by the opcode generator.

10. A method of operating a processor comprising a memory including a plurality of memory caches, and a hardware circuit for LU decomposition of an input matrix, the input matrix comprising a multitude of elements forming a plurality of rows and columns, the method comprising:
    the processor receiving the input matrix; and
    the processor processing the input matrix column-by-column to decompose the input matrix into a lower triangular matrix L and an upper triangular matrix U, including for each of the columns of the input matrix, reading the each column;
    when one of the columns of the input matrix has been processed prior to the processing of the each column, updating the elements of the each column, based on the one previously processed column of the input matrix, to obtain updated elements for the each column;
    choosing one of the elements of the each column as a pivot element;
    using the pivot element chosen for the each column to obtain one or more multipliers for the each column; and
    updating the L matrix with one or more of the multipliers of the each column, and updating the U matrix with one or more of the elements or updated elements of the each column; and wherein:
the choosing one of the elements of each of the columns as a pivot element for said each column includes choosing one of the elements of each of the columns as the pivot element for said each column based on magnitudes of the elements of said each column.

11. The method according to claim 10, wherein the choosing one of the elements of each of the columns as a pivot element for said each column based on magnitudes of the elements of said each column includes choosing the one of the elements of each of the columns as the pivot element for said each column based on absolute magnitudes of the elements of said each column.

12. The method according to claim 10, wherein the choosing one of the elements of each of the columns as a pivot element for said each column further includes identifying the elements of one or more of the rows of said each column as possible pivot elements based on the processing of one or more columns prior to the processing of said each column, and selecting one of the possible pivot elements of said each column as the pivot element of said each column.

13. The method according to claim 10, wherein:
the processing the input matrix column-by-column further includes, for each of the columns of the input matrix, reading the each column;
when one or more of the columns of the input matrix has been processed prior to the processing of the each column, the choosing one of the elements of each of the columns as a pivot element for said each column includes choosing one of the elements of each of the columns as the pivot element for said each column based on the one or more previously processed column of the input matrix.

14. The method according to claim 13, wherein the choosing one of the elements of each of the columns as the pivot element for said each column includes selecting one of the rows of said each column as a pivot row, and choosing the element of the column in the pivot row of the column as the pivot element.

15. Apparatus for LU decomposition of an input matrix, the input matrix comprising a multitude of elements forming a plurality of rows and columns, the apparatus comprising:
a memory including a plurality of memory caches; and
a processor unit operatively connected to the memory to transmit data to and receive data from the memory caches, the processing unit comprising a hardware circuit for:
processing the input matrix column-by-column to decompose the input matrix into a lower triangular matrix L and an upper triangular matrix U, including, for each of the columns of the input matrix, reading the each column;
when one of the columns of the input matrix has been processed prior to the processing of the each column, updating the elements of the each column, based on the one previously processed column of the input matrix, to obtain updated elements for the each column;
choosing one of the elements of the each column as a pivot element;
using the pivot element chosen for the each column to obtain one or more multipliers for the each column; and
updating the L matrix with one or more of the multipliers of the each column, and updating the U matrix with one or more of the elements or updated elements of the each column; and wherein:
the choosing one of the elements of the each column as a pivot element for said each column includes choosing one of the elements of the each column as the pivot element for said each column based on magnitudes of the elements of said each column.

16. The apparatus according to claim 15, wherein the choosing one of the elements of each of the columns as a pivot element for said each column based on magnitudes of the elements of said each column includes choosing one of the elements of each of the columns as the pivot element for said each column based on absolute magnitudes of the elements of said each column.

17. The apparatus according to claim 15, wherein the choosing one of the elements of each of the columns as a pivot element for said each column further includes identifying the elements of one or more of the rows of said each column as possible pivot elements based on the processing of one or more columns prior to the processing of said each column, and selecting one of the possible pivot elements of said each column as the pivot element of said each column.

18. The apparatus according to claim 15, wherein:
the processing the input matrix column-by-column further includes, for each of the columns of the input matrix, reading the each column;
when one or more of the columns of the input matrix has been processed prior to the processing of the each column, the choosing one of the elements of each of the columns as a pivot element for said each column includes choosing one of the elements of each of the columns as the pivot element for said each column based on the one or more previously processed column of the input matrix.

19. The apparatus according to claim 18, wherein the choosing one of the elements of each of the columns as the pivot element for said each column includes selecting one of the rows of said each column as a pivot row, and choosing the element of the column in the pivot row of the column as the pivot element.

* * * * *